US012632684B2

(12) United States Patent
Kojima et al.

(10) Patent No.: US 12,632,684 B2
(45) Date of Patent: May 19, 2026

(54) ELECTRONIC COMPONENT, METHOD FOR MANUFACTURING ELECTRONIC COMPONENT, AND TRACEABILITY SYSTEM

(71) Applicant: Murata Manufacturing Co., Ltd., Nagaokakyo (JP)

(72) Inventors: Keijiro Kojima, Nagaokakyo (JP); Chiaki Yamamoto, Nagaokakyo (JP); Seika Oho, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 19/042,221

(22) Filed: Jan. 31, 2025

(65) Prior Publication Data

US 2025/0173533 A1 May 29, 2025

Related U.S. Application Data

(63) Continuation of application No. PCT/JP2023/042655, filed on Nov. 29, 2023.

(30) Foreign Application Priority Data

Mar. 13, 2023 (JP) ................................ 2023-038647

(51) Int. Cl.
*G06K 7/14* (2006.01)
*H01G 4/232* (2006.01)
*H01G 4/30* (2006.01)

(52) U.S. Cl.
CPC ........... *G06K 7/1417* (2013.01); *H01G 4/232* (2013.01); *H01G 4/30* (2013.01)

(58) Field of Classification Search
CPC ....... G06K 19/06037; G06K 19/06046; G06K 19/06159; G06K 19/06112; G06K 7/1417; H01G 4/232; H01G 4/30
See application file for complete search history.

(56) References Cited

U.S. PATENT DOCUMENTS

| | | | | |
|---|---|---|---|---|
| 5,866,895 A | * | 2/1999 | Fukuda | ................. G11B 7/0033 |
| 2013/0264389 A1 | * | 10/2013 | Shaffer | ............ G06K 19/06178 |
| | | | | 235/494 |
| 2014/0292141 A1 | * | 10/2014 | Nishisaka | ............ H10N 30/872 |
| | | | | 336/200 |
| 2021/0248435 A1 | * | 8/2021 | Echigoya | ................. H01G 4/30 |

FOREIGN PATENT DOCUMENTS

| | | |
|---|---|---|
| JP | H06-325967 A | 11/1994 |
| JP | 2012-043953 A | 3/2012 |
| JP | 2012-190084 A | 10/2012 |
| JP | 2014-229647 A | 12/2014 |
| JP | 2021-125584 A | 8/2021 |
| JP | 2021-125585 A | 8/2021 |
| JP | 2023-023615 A | 2/2023 |

OTHER PUBLICATIONS

International Search Report and Written Opinion mailed on Feb. 20, 2024, received for PCT Application PCT/JP2023/042655, filed on Nov. 29, 2023, 9 pages including English Translation.

* cited by examiner

*Primary Examiner* — Laura A Gudorf
(74) *Attorney, Agent, or Firm* — XSENSUS LLP

(57) ABSTRACT

An electronic component including an element body and external electrodes provided on the element body, in which metal particles having a particle radius of 10 nm or more and 1000 nm or less are disposed on the element body so as to form a code.

1 Claim, 11 Drawing Sheets

10,10a    41   40    30   31          22

10,10a    42    40     30    32              22

ELECTRONIC COMPONENT, METHOD FOR MANUFACTURING ELECTRONIC COMPONENT, AND TRACEABILITY SYSTEM

CROSS-REFERENCE TO RELATED APPLICATIONS

This is a continuation application of PCT/JP2023/042655, filed on Nov. 29, 2023, designating the United States of America, which is based on and claims priority to Japanese Patent Application No. JP 2023-038647 filed on Mar. 13, 2023. The entire contents of the above-identified applications, including the specifications, drawings and claims, are incorporated herein by reference in their entirety.

TECHNICAL FIELD

The present disclosure relates to an electronic component, a method for manufacturing the electronic component, and a traceability system.

BACKGROUND ART

In recent years, a circular economy has been socially demanded. In addition, electronic device disposal (E-Waste) is increasing year by year. However, mounted electronic components are often discarded after being crushed. For resource circulation of the electronic component, it is important to grasp what is the electronic component removed from the waste electronic board for, where the electronic component is made, and what materials (components) are included.

Patent Document 1 describes a traceability system for electronic components that are produced collectively in each lot and stored in a plurality of reels in each lot, the traceability system including a lot number input device, an identification mark reader that reads a unique identification mark attached to each reel body, a host computer that is used to link reel unit traceability information and lot unit traceability information to the identification mark for each reel, and a user terminal that acquires the lot unit traceability information and the reel unit traceability information for each reel on the basis of the identification mark.

Patent Document 2 describes an electronic component having an authentication pattern formed on exposed surfaces, in which the authentication pattern has a base section including a resin and colored particles having a hue that can be identified in the base section, and the colored particles are dispersed in the base section so as to form a dotted pattern.

Patent Document 3 describes a small electronic component, in which a lot number including a component manufacturing date and a manufacturing serial number is displayed by painted patterns that are differentiated by using symbols that can be identified also in the case of same numbers, and a lot code is written by square display in which the numbers are represented by positions of squares.

Patent Document 4 describes a multilayer chip component that includes an element body having a laminate structure including a plurality of ceramic layers and provided with a code including a plurality of dot-shaped recesses arranged on a main surface orthogonal to a lamination direction and in which the dot-shaped recesses have a semicircular sectional shape.

Patent Document 5 describes a method for manufacturing a multilayer chip component, the method including: a step of forming a code in each of a plurality of individual regions on a main surface of a laminate substrate in which a plurality of green sheets are laminated, the code indicating at least information for identifying an intermediate product in a previous stage and information for identifying an individual finished product; a step of dividing the laminate substrate according to each of the individual regions to form a plurality of green chips; and a step of making the green chips into multilayer chip components as finished products.

PRIOR ART DOCUMENTS

Patent Documents

Patent Document 1: Japanese Patent Application Laid-Open No. 2014-229647
Patent Document 2: Japanese Patent Application Laid-Open No. 2012-043953
Patent Document 3: Japanese Patent Application Laid-Open No. H06-325967
Patent Document 4: Japanese Patent Application Laid-Open No. 2021-125584
Patent Document 5: Japanese Patent Application Laid-Open No. 2021-125585

SUMMARY OF THE DISCLOSURE

Problem to be Solved by the Disclosure

However, in the case of lot description per reel unit, assuming each component is collected from the market after being mounted on the board, it is not possible to confirm the history of the component. In addition, since the label applied to the reel can be replaced, counterfeiting is easy.

Notation such as printing can be performed on a large unit such as a semiconductor chip or a module thereof, but it is difficult with a small component. In a coating method such as inkjet, the area of the printed portion is on the order of mm.

Assuming the element body is scraped by laser processing or the like, there is a risk of leading to a decrease in mechanical strength, or characteristic abnormality or appearance defect due to adsorption of contamination in the step of scraping the element body. In the case of processing an unfired green sheet, due to deformation after firing, there is a possibility that identification accuracy of a code is deteriorated. Furthermore, since a barrel step for taking corners of a product, a coating and plating step for forming an external electrode, and the like are performed subsequently, there is also a possibility of leading to a decrease in yield in these steps.

The present disclosure has been made to solve the above problems, and an object of the present disclosure is to provide an electronic component capable of suppressing a decrease in mechanical strength, a method for manufacturing the electronic component, and a traceability system.

Means for Solving the Problem

According to a first aspect of the present disclosure, there is provided an electronic component including an element body and an external electrode provided on the element body, in which metal particles having a particle radius of 10 nm or more and 1000 nm or less are disposed on the element body so as to form a code.

According to a second aspect of the present disclosure, there is provided an electronic component including an element body and an external electrode provided on the element body, in which recesses having a radius of 10 nm or more and 1000 nm or less in plan view are disposed on the element body so as to form a code.

According to a third aspect of the present disclosure, there is provided a method for manufacturing the electronic component according to the first aspect, the method including the steps of: preparing a solution containing a metal ion; filling the solution into a probe having a cylinder shape in which an electrode is disposed; controlling an X point, a Y point, and a Z point of the probe to bring a tip of the probe close to an element body of the electronic component; bringing the solution discharged from the tip of the probe into contact with the element body to form a meniscus between the element body and the probe; and applying a voltage between an external electrode of the electronic component and the electrode in a state where the meniscus is formed to deposit a metal particle on the element body.

According to a fourth aspect of the present disclosure, there is provided a method for manufacturing the electronic component according to the second aspect, the method including the steps of: preparing a solution containing a strong acid; filling the solution into a probe having a cylinder shape; controlling an X point, a Y point, and a Z point of the probe to bring a tip of the probe close to an element body of the electronic component; bringing the solution discharged from the tip of the probe into contact with the element body to form a meniscus between the element body and the probe; and dissolving a part of the element body in a state where the meniscus is formed to form a recess on the element body.

According to a fifth aspect of the present disclosure, there is provided a traceability system including: a code reader that reads the code of the electronic component according to the first or second aspect, the code indicating information including a product type of the electronic component; a database storing component treatment information specifying a treatment method after use of the electronic component for each product type of the electronic component; and an information processing apparatus that collates the product type of the electronic component read by the code reader with the component treatment information in the database to determine a treatment method after use of the electronic component.

Advantageous Effect of the Disclosure

According to the present disclosure, it is possible to provide an electronic component capable of suppressing a decrease in mechanical strength, a method for manufacturing the electronic component, and a traceability system.

MODE FOR CARRYING OUT THE DISCLOSURE

Hereinafter, an electronic component, a method for manufacturing the electronic component, and a traceability system according to the present disclosure will be described. However, the present disclosure is not limited to a configuration below, and can be appropriately modified and applied within a range in which the gist of the present disclosure is not changed. Note that the present disclosure also includes a combination of two or more of individual desirable configurations described below.

(Electronic Component)

Figure 1:
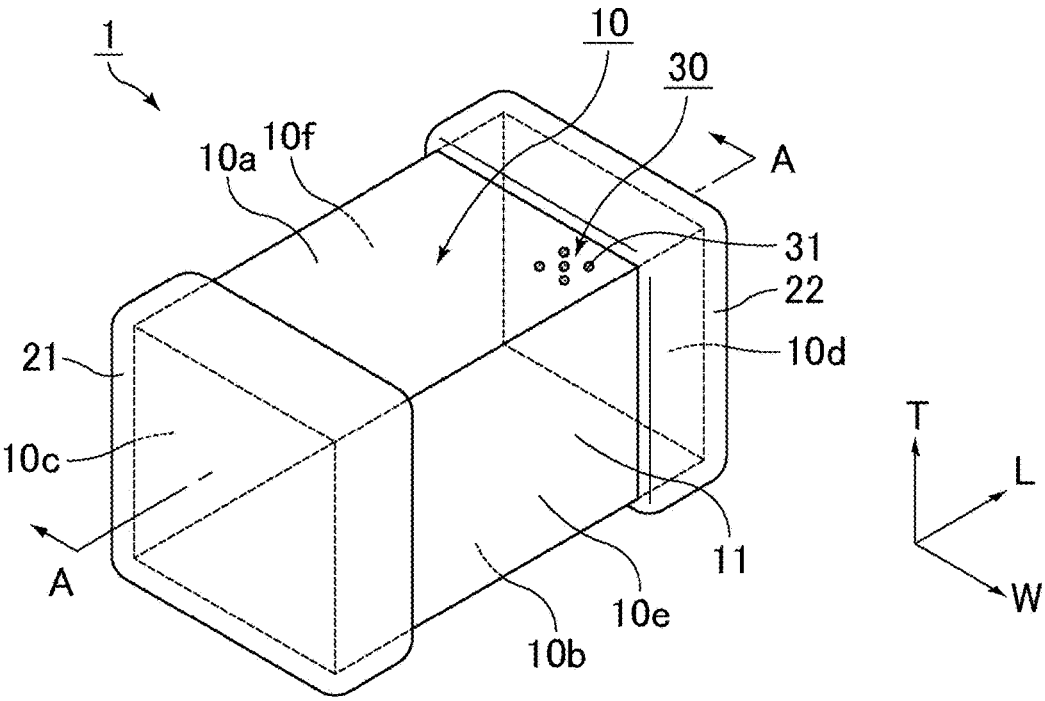
FIG. 1 is a perspective view schematically illustrating an example of an electronic component according to an embodiment of the present disclosure.

First, an electronic component according to an embodiment of the present disclosure will be described. FIG. 1 is a perspective view schematically illustrating an example of the electronic component according to the embodiment of the present disclosure.

An electronic component 1 illustrated in FIG. 1 is a small chip type electronic component (surface mount electronic component), and includes an element body 10 and external electrodes 21 and 22 provided on the element body 10.

The size of the electronic component 1 is not particularly limited, and may be, for example, 1005 size, 0603 size, 0402 size, 0201 size, or the like.

A specific type of the electronic component 1 is not particularly limited. Specific examples thereof include multilayer ceramic electronic components such as a multilayer ceramic capacitor, a multilayer coil, a multilayer thermistor, a multilayer varistor, a multilayer LC filter, and a multilayer piezoelectric filter.

In this case, the element body 10 preferably includes a multilayer body in which at least any of a dielectric ceramic layer, a magnetic ceramic layer, a piezoelectric ceramic layer, or a semiconductor ceramic layer and an internal electrode layer as an internal conductor are layered.

Further, the electronic component 1 does not need to be a multilayer component as described above, and specific examples in this case include a silicon capacitor, a ferrite coil, and an inductor including a composite material of metal powder and resin.

The element body 10 includes a dielectric layer 11 and an internal conductor (internal electrode layer, not illustrated in FIG. 1), and has a top surface 10a and a bottom surface 10b facing each other in a height direction T, a first side surface 10c and a second side surface 10d facing each other in a length direction L orthogonal to the height direction T, and a third side surface 10e and a fourth side surface 10f facing each other in a width direction W orthogonal to the height direction T and the length direction L.

As described above, the element body 10 has a substantially rectangular parallelepiped outer shape, but may have a corner portion and a ridge portion that are rounded. The corner portion is a portion where three surfaces of the element body 10 intersect, and the ridge portion is a portion where two surfaces of the element body 10 intersect.

The electronic component 1 is mounted on a mounting substrate such that the bottom surface 10b faces the mounting surface of the mounting substrate. That is, the bottom surface 10b is the mounting surface.

Note that areas of the top surface 10a and the bottom surface 10b may be substantially the same as or different from areas of the third side surface 10e and the fourth side surface 10f. Further, areas of the first side surface 10c and the second side surface 10d may be substantially the same as or different from areas of the third side surface 10e and the fourth side surface 10f.

A surface of the element body 10 is constituted of the dielectric layer 11 except for an exposed portion of the internal conductor.

The dielectric layer 11 can be formed of, for example, a dielectric material (oxide). The dielectric material can be appropriately selected according to a type of the electronic component 1, and examples of the dielectric material include a dielectric ceramic material, a magnetic ceramic material, a piezoelectric ceramic material, and a semiconductor ceramic material.

Examples of the dielectric ceramic material include those containing a main component such as barium titanate, calcium titanate, strontium titanate, barium calcium titanate, or calcium zirconate. In a case where the dielectric ceramic material described above is contained as a main component, the electronic component 1 may function as a multilayer ceramic capacitor. However, depending on a characteristic of a desired multilayer ceramic capacitor, a dielectric ceramic material to which an accessory component, which has a content smaller than that of the main component, such as a Mg compound, a Mn compound, a Si compound, an Al compound, a V compound, a Ni compound, or a rare earth compound is added may be used.

Examples of the magnetic ceramic material include those containing a main component such as a ferrite ceramic material. In a case where the magnetic ceramic material is used, the electronic component 1 may function as a multilayer coil.

Specific examples of the piezoelectric ceramic material include a lead zirconate titanate (PZT)-based ceramic material. In a case where the piezoelectric ceramic material is used, the electronic component 1 may function as a multilayer piezoelectric filter.

Specific examples of the semiconductor ceramic material include a spinel-based ceramic material. In a case where the semiconductor ceramic material is used, the electronic component 1 may function as a multilayer thermistor.

The external electrodes 21 and 22 are provided on a surface of the element body 10.

The external electrode 21 is provided on the first side surface 10c of the element body 10. In FIG. 1, the external electrode 21 is provided from the first side surface 10c of the element body 10 to each of the top surface 10a, the bottom surface 10b, the third side surface 10e, and the fourth side surface 10f. The external electrode 21 is electrically connected to the internal conductor exposed on the first side surface 10c from the element body 10.

The external electrode 22 is provided on the second side surface 10d of the element body 10. In FIG. 1, the external electrode 22 is provided from the second side surface 10d of the element body 10 to each of the top surface 10a, the bottom surface 10b, the third side surface 10e, and the fourth side surface 10f. The external electrode 22 is electrically connected to the internal conductor exposed on the second side surface 10d from the element body 10.

Figure 2:
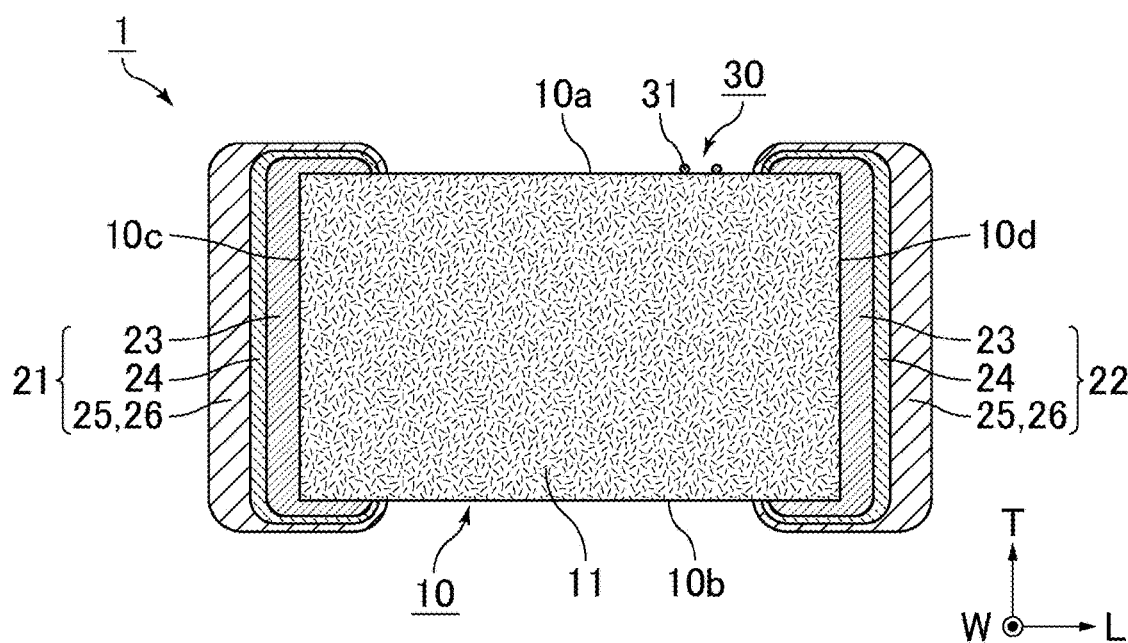
FIG. 2 is an example of a sectional view taken along line A-A of the electronic component illustrated in FIG. 1.

FIG. 2 is an example of a sectional view taken along line A-A of the electronic component illustrated in FIG. 1. In FIG. 2, illustration of the internal conductor of the element body 10 is omitted.

As illustrated in FIG. 2, the external electrodes 21 and 22 have a resin electrode layer 23 containing a conductive component and a resin component. The conductive component contains, as a main component, a single metal such as silver, copper, nickel, or tin, or an alloy containing at least one of these metals. The resin component contains epoxy resin, phenol resin, or the like as a main component. The resin electrode layer can be formed using, for example, conductive paste such as silver paste.

Note that the external electrodes 21 and 22 may include a baked electrode layer of copper or silver instead of the resin electrode layer 23. The baked electrode layer of copper or silver is specifically an electrode formed by baking a paste material of copper or silver containing a glass component.

In addition, the external electrodes 21 and 22 have a so-called plating layer formed on the resin electrode layer 23 (or optionally the baked electrode layer of copper or silver, the same applies hereinafter) by a plating method. Specifically, the external electrodes 21 and 22 have a Ni plating layer 24 provided so as to cover the resin electrode layer 23, and a Sn plating layer 26 as an outermost layer 25 provided so as to cover the Ni plating layer 24.

Note that, as the outermost layer 25 of the external electrodes 21 and 22, a Au plating layer may be provided instead of the Sn plating layer 26.

Further, in the present disclosure, an external electrode preferably may be provided on a part of a surface of an element body, and the position where the external electrode is disposed is not particularly limited. For example, an external electrode may be disposed on a bottom surface of an element body, may be disposed so as to cover a part of any side surface of an element body and to extend from the side surface to cover a part of a bottom surface (L-shape in sectional view), or may be disposed so as to cover a part or whole of any side surface of an element body and to extend from the side surface to cover a part of a top surface and a part of a bottom surface (C-shape in sectional view).

Further, in the present disclosure, the number of external electrodes is not particularly limited, and at least one external electrode preferably may be provided for an element body. For example, four external electrodes may be provided for an element body (four terminals), or six external electrodes may be provided for an element body (six terminals).

Figure 3:
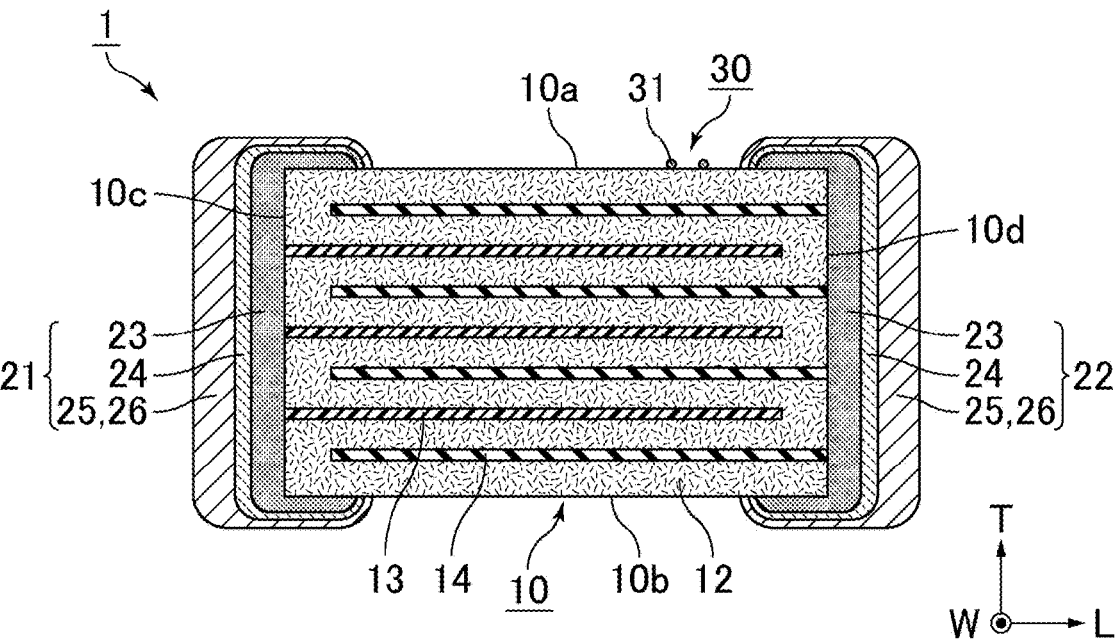
FIG. 3 is another example of the sectional view taken along line A-A of the electronic component illustrated in FIG. 1, and illustrates a case where the electronic component is a multilayer ceramic capacitor.

FIG. 3 is another example of the sectional view taken along line A-A of the electronic component illustrated in FIG. 1, and illustrates a case where the electronic component is a multilayer ceramic capacitor.

In this case, the element body 10 is a multilayer body in which a dielectric ceramic layer 12 as the dielectric layer 11 and internal electrode layers 13 and 14 as the internal conductor are layered.

The internal electrode layer 13 is drawn out to the first side surface 10c of the element body 10 and connected to the external electrode 21, and the internal electrode layer 14 is drawn out to the second side surface 10d of the element body 10 and connected to the external electrode 22.

The dielectric ceramic layer 12 can be obtained by forming dielectric slurry containing a dielectric ceramic material and an organic solvent into a sheet.

The internal electrode layers 13 and 14 can be obtained by applying an electrode paste containing a conductive component. The internal electrode layers 13 and 14 are preferably Ni electrode layers using Ni as a conductive component.

Instead of a Ni electrode layer, a Ag electrode layer, a Pd electrode layer, or a Cu electrode layer may be used.

Figure 4:
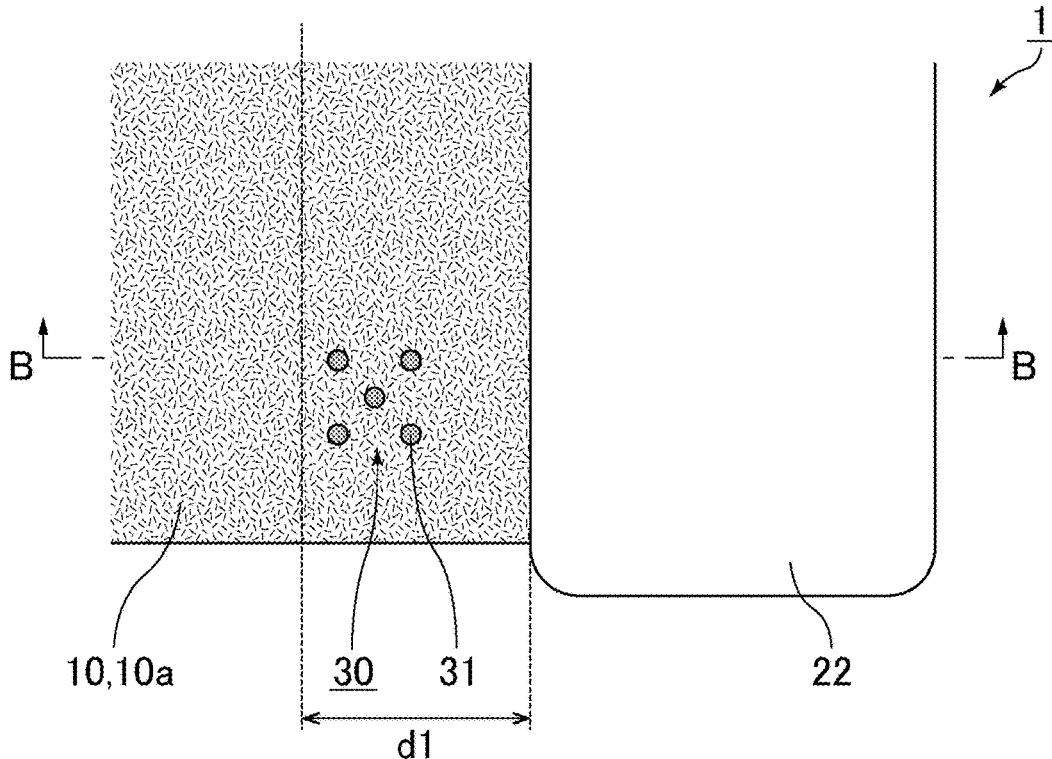
FIG. 4 is an enlarged plan view of a code forming portion of the electronic component illustrated in FIG. 1.
Figure 5:
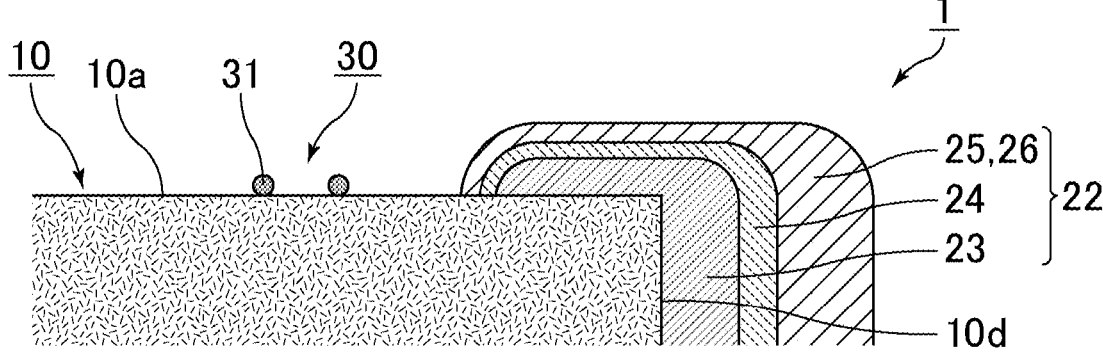
FIG. 5 is an example of a sectional view taken along line B-B of the electronic component illustrated in FIG. 4.

FIG. 4 is an enlarged plan view of a code forming portion of the electronic component illustrated in FIG. 1. FIG. 5 is an example of a sectional view taken along line B-B of the electronic component illustrated in FIG. 4.

As illustrated in FIGS. 1 to 5, metal particles 31 having a particle radius of 10 nm or more and 1000 nm or less are disposed on the element body 10 so as to form a code 30. As described above, since the code 30 is formed of metal fine particles on the element body 10, it is possible to suppress a decrease in mechanical strength of the electronic component 1, and it is difficult to easily counterfeit the code 30. In addition, since the code 30 of the metal particles 31 is provided for each electronic component 1, identification information and history information of the component can be confirmed for each electronic component 1. Also, since the code 30 of the metal particles 31 can be formed in a very narrow region, it can be provided in a small electronic component. In addition, since it is not necessary to scrape the element body 10, it is possible to prevent characteristic abnormality and appearance defect due to adsorption of contamination. Furthermore, since the code 30 of the metal particles 31 can be formed after firing of the element body 10 as described later, it is also possible to prevent a decrease in identification accuracy of the code 30 due to deformation caused by firing.

Note that the metal particles 31 and metal particles 41 to be described later can be observed with, for example, a scanning electron microscope (SEM), a digital microscope capable of enlarging 5000 times or more, or the like, and the particle radius can also be measured on the basis of the observation image. Specifically, each radius measured assuming the metal particles 31 and 41 are viewed in a plan view (observed from a direction orthogonal to the surface of the element body 10) in the observation image is defined as the particle radius. Although the metal particles 31 and 41 have a circular shape, an elliptical shape, or the like in plan view, assuming the metal particle has different radii, the shortest length is defined as the particle radius.

The code 30 is, for example, a two-dimensional code conforming to rules of a DataMatrix code, a QR code (registered trademark), a MicroQR code, or the like, and is formed in a rectangular region. The code 30 may be a matrix type or a stack type. In code 30, a data cell representing a minimum unit of data is point-like (may be triangular or square), and a metal particle 31 is provided as a dot in some data cells. That is, the code 30 is formed of an aggregate of the plurality of metal particles 31 arranged. In the case illustrated in FIG. 1, one metal particle 31 constitutes each dot, and one metal particle 31 is disposed for one data cell.

Figure 6:
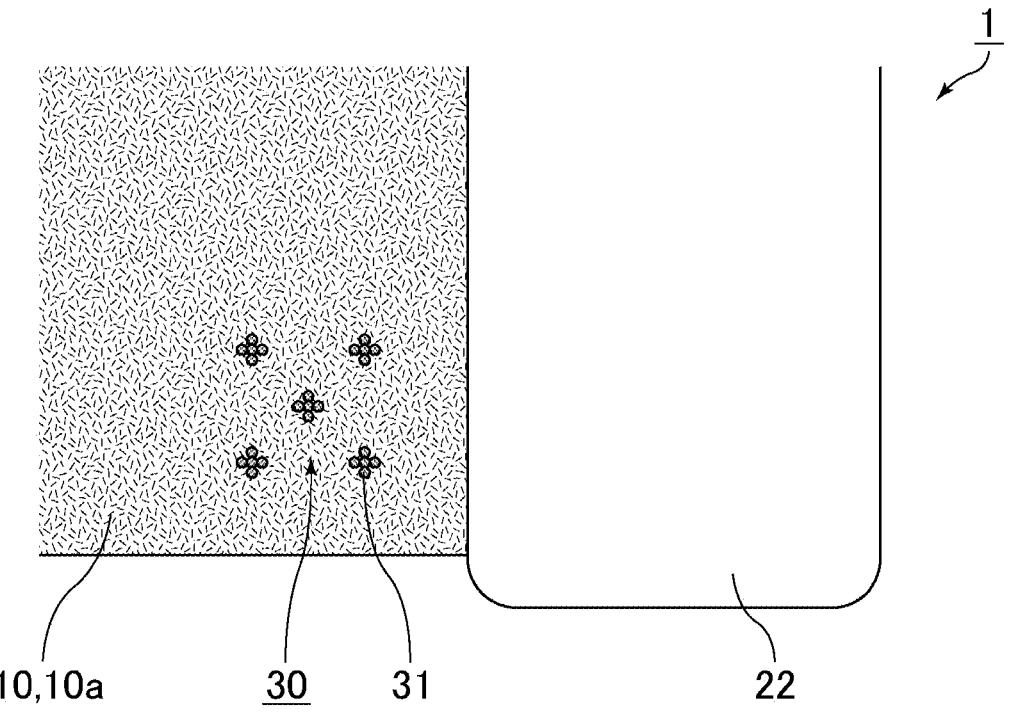
FIG. 6 is a plan view schematically illustrating a modification of the electronic component illustrated in FIG. 1, and is an enlarged view of a code forming portion.

FIG. 6 is a plan view schematically illustrating a modification of the electronic component illustrated in FIG. 1, and is an enlarged view of a code forming portion.

As illustrated in FIG. 6, a plurality of metal particles 31 may constitute each dot, and a plurality of metal particles 31 may be disposed for one data cell.

The position where the code 30 is disposed is not particularly limited, but is preferably any one of the top surface 10a, the bottom surface 10b, the third side surface 10e, or the fourth side surface 10f, and more preferably any one of the top surface 10a, the third side surface 10e, or the fourth side surface 10f.

As illustrated in FIG. 4, the code 30 is preferably disposed within a range d1 within 100 μm (more preferably within 50 μm) from the external electrode 22 (or 21). In this way, the metal particles 31 can be easily deposited using a leakage current from the external electrode 22 (or 21) by a manufacturing method to be described later.

The information indicated by the code 30 includes, for example, a component ID that is information for identifying the electronic component 1, product type information that is information indicating a product type of the electronic component 1, and material information that is information indicating materials included in the electronic component 1.

The product type information may be information directly indicating the product type of the electronic component 1, for example, a product name, or may be information indirectly indicating the product type of the electronic component 1, for example, a product number set according to each product type. The same applies to the material information.

The particle radius of the metal particles 31 is preferably 10 nm or more and 1000 nm or less, and more preferably 100 nm or more and 500 nm or less.

The shape of the metal particles 31 is usually a spherical shape, an oblate spherical shape, a hemispherical shape, a disk shape in which both surfaces have a concave center, a snowball shape, or the like. In the case of the hemispherical shape, the metal particles 31 are usually disposed on the element body 10 such that planar portions thereof are in surface contact with the element body 10.

The material of the metal particles 31 is not particularly limited, and examples thereof include Ni, Cu, Au, and Ag. Among them, Ni and Cu are preferable from the viewpoints of having a melting point of a temperature at the time of mounting (for example, 250° C.) or higher and being inexpensive.

Since the metal particles 31 and the element body 10 are formed of different materials as described above, it is possible to acquire a light-dark image between the metal particles 31 and the element body 10, and it is possible to read the code 30 on the basis of the image.

Figure 7:
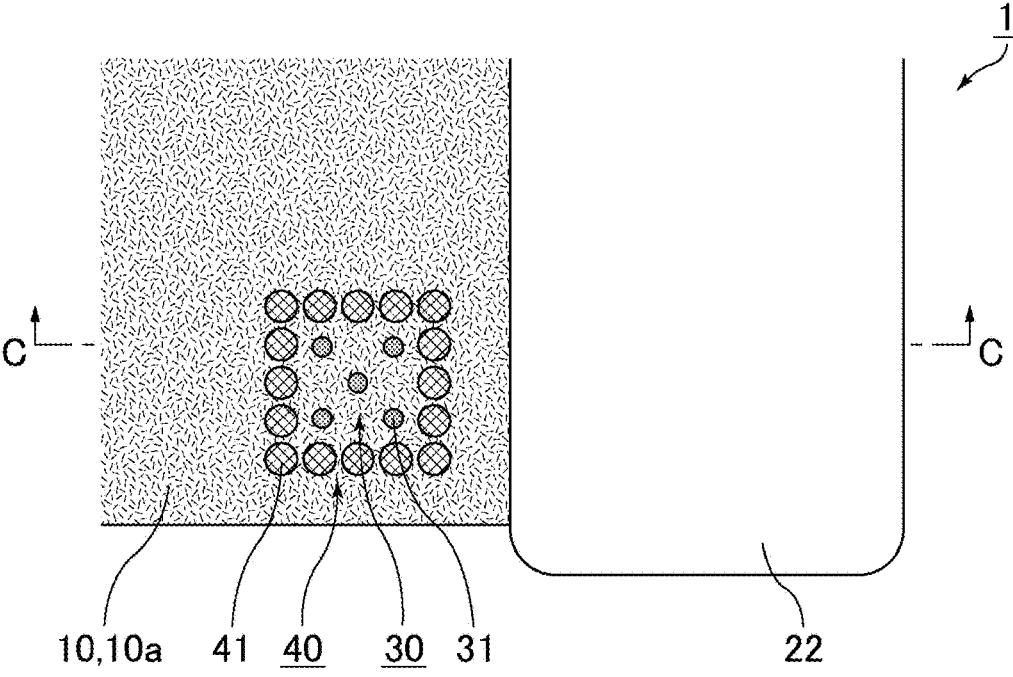
FIG. 7 is a plan view schematically illustrating another modification of the electronic component illustrated in FIG. 1, and is an enlarged view of a code forming portion.
Figure 8:
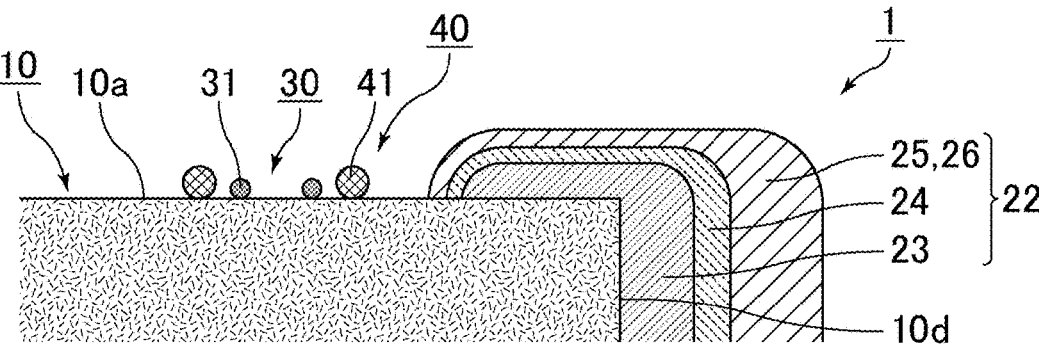
FIG. 8 is an example of a sectional view taken along line C-C of the electronic component illustrated in FIG. 7.

FIG. 7 is a plan view schematically illustrating another modification of the electronic component illustrated in FIG. 1, and is an enlarged view of a code forming portion. FIG. 8 is an example of a sectional view taken along line C-C of the electronic component illustrated in FIG. 7.

As illustrated in FIGS. 7 and 8, metal particles 41 having a particle radius different from the particle radius of the metal particles 31 forming the code 30 may be disposed on the element body 10 so as to form a frame portion 40 surrounding the code 30. In this way, since the formation range of the code 30 can be more easily specified, the code 30 can be more easily read. The frame portion 40 can have, for example, a rectangular shape.

The particle radius of the metal particles 41 forming the frame portion 40 is preferably larger than the particle radius of the metal particles 31 forming the code 30. Specifically, the particle radius of the metal particles 41 is preferably 100 nm or more and 1000 nm or less, more preferably 200 nm or more and 1000 nm or less, and still more preferably 500 nm or more and 1000 nm or less.

The shape of the metal particles 41 is usually a spherical shape, an oblate spherical shape, a hemispherical shape, a disk shape in which both surfaces have a concave center, a snowball shape, or the like. In the case of the hemispherical shape, the metal particles 41 are usually disposed on the element body 10 such that planar portions thereof are in surface contact with the element body 10. The shapes of the metal particles 31 and the metal particles 41 may be different from each other or substantially the same.

The material of the metal particles 41 is not particularly limited, and examples thereof include Ni, Cu, Au, and Ag. Among them, Ni and Cu are preferable from the viewpoints of having a melting point of a temperature at the time of mounting (for example, 250° C.) or higher and being inexpensive. The materials of the metal particles 31 and the metal particles 41 may be different from each other or substantially the same.

Figure 9:
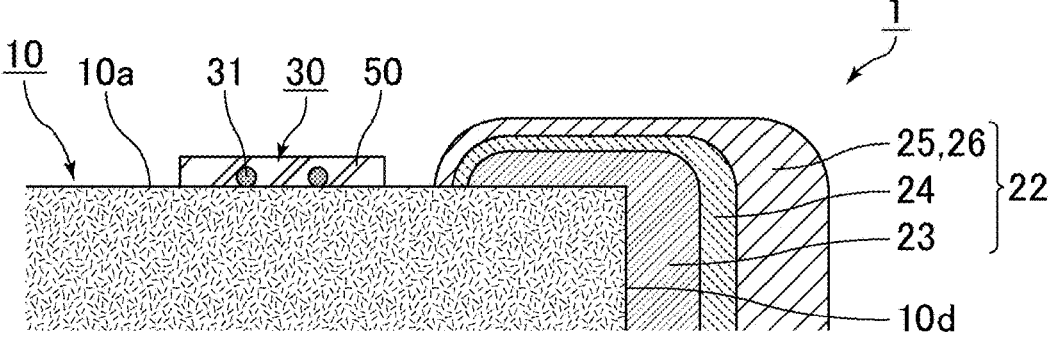
FIG. 9 is a sectional view schematically illustrating still another modification of the electronic component illustrated in FIG. 1, and is an enlarged view of a code forming portion.

FIG. 9 is a sectional view schematically illustrating still another modification of the electronic component illustrated in FIG. 1, and is an enlarged view of a code forming portion.

As illustrated in FIG. 9, a glass coating film 50 that covers the metal particles 31 forming the code 30 may be further provided on the element body 10. This can effectively prevent the metal particles 31 from falling off from the surface of the element body 10, and thus can effectively prevent the degradation of the identification accuracy of the code 30 due to the falling off of the metal particles 31. The shape of the glass coating film 50 can be the same shape as the formation region of the code 30, for example, a rectangular shape.

The type of glass constituting the glass coating film 50 is not particularly limited, and examples thereof include those having a composition containing $SiO_2$, $TiO_2$, $Al_2O_3$, or the like, mixtures thereof, and various additives, fillers, or the like. Among them, glass containing $SiO_2$ as a main component is easily collected, and has a wide range of composition systems including additives.

The film thickness of the glass coating film 50 is not particularly limited, but is preferably 50 nm or more and 3000 nm or less, more preferably 300 nm or more and 2000 nm or less, and still more preferably 500 nm or more and 1500 nm or less.

Assuming a frame portion 40 is formed, the glass coating film 50 preferably covers the frame portion 40 together with the code 30.

Figure 10:
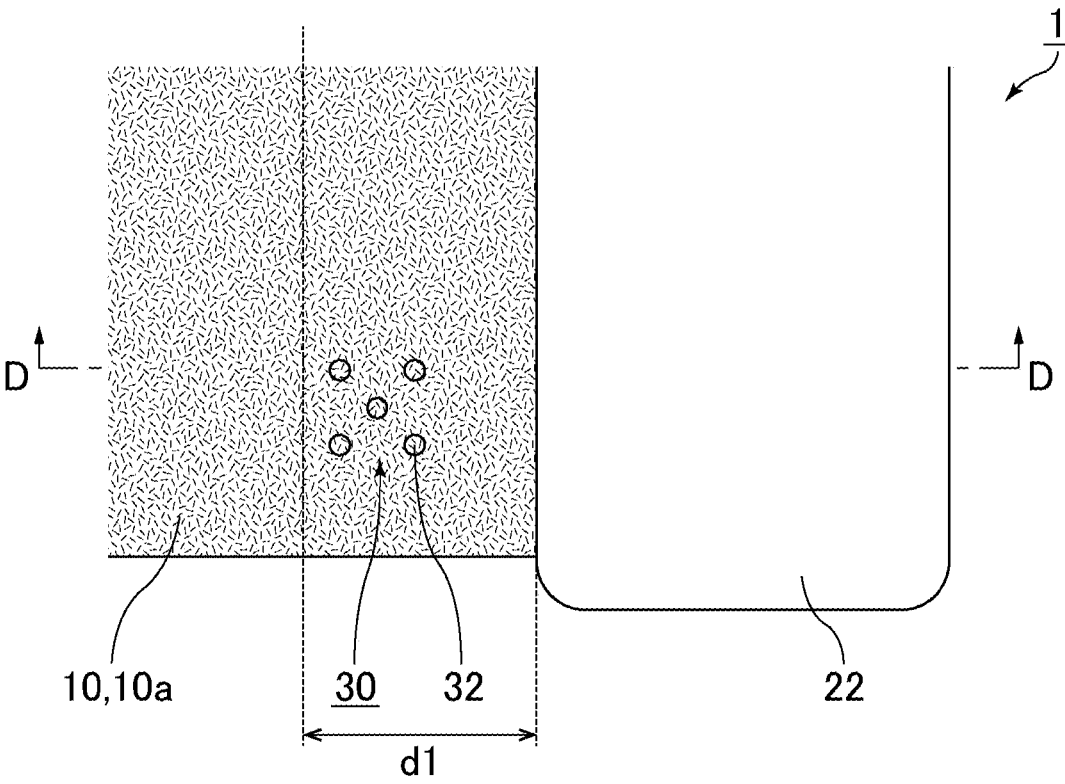
FIG. 10 is a sectional view schematically illustrating still another modification of the electronic component illustrated in FIG. 1, and is an enlarged view of a code forming portion.
Figure 11:
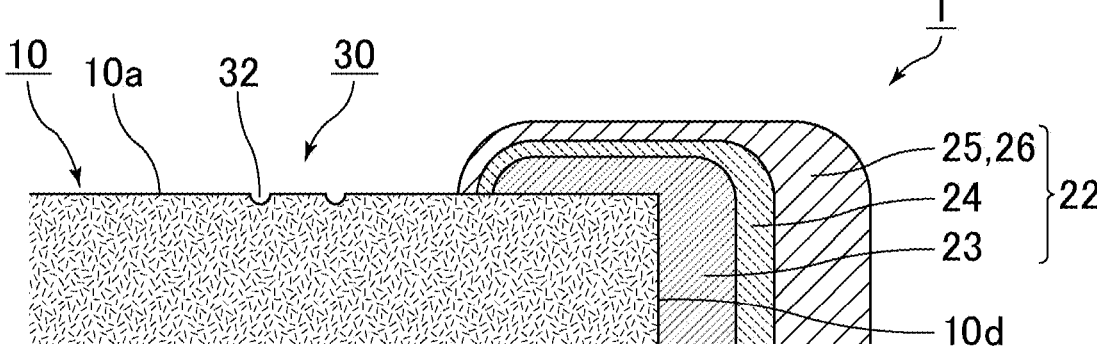
FIG. 11 is an example of a sectional view taken along line D-D of the electronic component illustrated in FIG. 10.

FIG. 10 is a sectional view schematically illustrating still another modification of the electronic component illustrated in FIG. 1, and is an enlarged view of a code forming portion. FIG. 11 is an example of a sectional view taken along line D-D of the electronic component illustrated in FIG. 10.

As illustrated in FIGS. 10 and 11, recesses 32 having a radius of 10 nm or more and 1000 nm or less in plan view may be disposed on the element body 10 so as to form the code 30. That is, such a recess 32 may be disposed as a dot provided in the data cell of the code 30 instead of the metal particle 31, or the code 30 may be formed of an aggregate of a plurality of arranged recesses 32. The recess 32 is provided by removing a part of the surface of the element body 10, but is very fine, and thus, also in this case, it is possible to suppress a decrease in mechanical strength of the electronic component 1, and it is difficult to easily counterfeit the code 30. In addition, since the code 30 of the recesses 32 is provided for each electronic component 1, identification information and history information of the component can be confirmed for each electronic component 1. Also, since the code 30 of the recesses 32 can be formed in a very narrow region, it can be provided in a small electronic component. In addition, since the recesses 32 can be formed by local dissolution of the element body 10 as described later, it is possible to prevent characteristic abnormality and appearance defect due to adsorption of contamination. Furthermore, since the code 30 of the recesses 32 can be formed after firing of the element body 10 as described later, it is also possible to prevent a decrease in identification accuracy of the code 30 due to deformation caused by firing.

Note that the recesses 32 and recesses 42 to be described later can be observed with, for example, a scanning electron microscope (SEM), a digital microscope capable of enlarging 5000 times or more, or the like, and the radius thereof can also be measured on the basis of the observation image. Specifically, each radius measured assuming the recesses 32 and 42 are viewed in a plan view (observed from a direction orthogonal to the surface of the element body 10) in the observation image is defined as the radius thereof. Although the recesses 32 and 42 have a circular shape or an elliptical shape in plan view, assuming the recess has different radii, the shortest length is defined as the radius.

In the case illustrated in FIG. 10, one recess 32 constitutes each dot, and one recess 32 is disposed for one data cell.

However, as in the case of the metal particles 31 illustrated in FIG. 6, a plurality of recesses 32 may constitute each dot, and a plurality of recesses 32 may be disposed for one data cell.

As illustrated in FIG. 10, similarly to the case of the metal particles 31, the code 30 is preferably disposed within a range d1 within 100 μm (more preferably within 50 μm) from the external electrode 22 (or 21). In this way, the recesses 32 can be easily deposited using a leakage current from the external electrode 22 (or 21) by a manufacturing method to be described later.

The radius of the recesses 32 in plan view is preferably 10 nm or more and 1000 nm or less, and more preferably 100 nm or more and 500 nm or less.

The shape of the recesses 32 in plan view is usually circular, but may be elliptical.

The depth of the recesses 32 is not particularly limited, but is preferably 10 nm or more and 1000 nm or less, more preferably 50 nm or more and 500 nm or less, and still more preferably 100 nm or more and 300 nm or less.

Since the recesses 32 are formed on the surface of the element body 10 as described above, it is possible to acquire a light-dark image between the recesses 32 and a region other than the recesses 32 of the element body 10, and it is possible to read the code 30 on the basis of the image.

Figure 12:
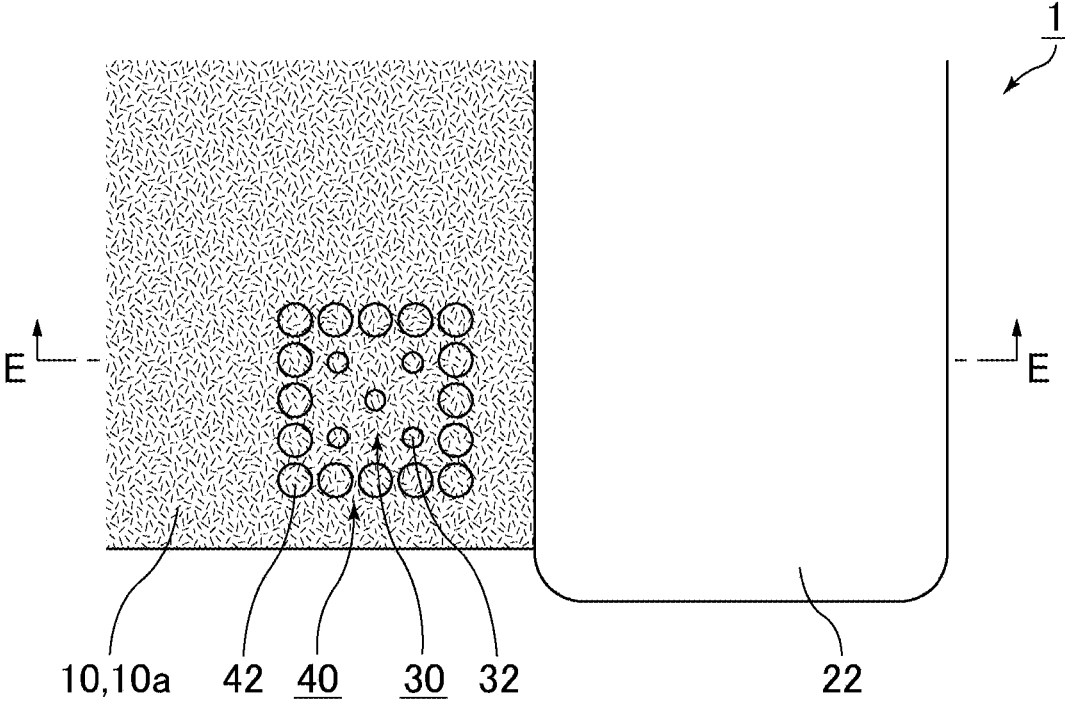
FIG. 12 is a plan view schematically illustrating another modification of the electronic component illustrated in FIG. 1, and is an enlarged view of a code forming portion.
Figure 13:
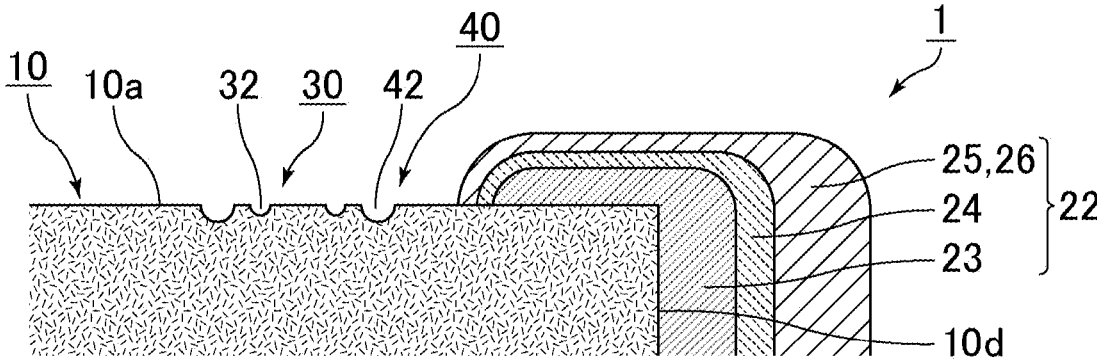
FIG. 13 is an example of a sectional view taken along line E-E of the electronic component illustrated in FIG. 12.

FIG. 12 is a plan view schematically illustrating another modification of the electronic component illustrated in FIG. 1, and is an enlarged view of a code forming portion. FIG. 13 is an example of a sectional view taken along line E-E of the electronic component illustrated in FIG. 12.

As illustrated in FIGS. 12 and 13, recesses 42 having a radius different from the radius of the recesses 32 in plan view may be disposed on the element body 10 so as to form a frame portion 40 surrounding the code 30. In this way, since the formation range of the code 30 can be more easily specified, the code 30 can be more easily read. The frame portion 40 can have, for example, a rectangular shape.

The radius of the recesses 42 forming the frame portion 40 in plan view is preferably larger than the radius of the recesses 32 forming the code 30 in plan view. Specifically, the radius of the recesses 42 in plan view is preferably 100 nm or more and 1000 nm or less, more preferably 200 nm or more and 1000 nm or less, and still more preferably 500 nm or more and 1000 nm or less.

The shape of the recesses 42 in plan view is usually circular, but may be elliptical. The shapes of the recesses 32 and the recesses 42 in plan view may be different from each other or substantially the same.

The depth of the recesses 42 forming the frame portion 40 is not particularly limited, but is preferably 100 nm or more and 1000 nm or less, more preferably 200 nm or more and 500 nm or less, and still more preferably 30 nm or more and 500 nm or less.

(Method for Manufacturing Electronic Component)

Next, a method for manufacturing an electronic component according to an embodiment of the present disclosure will be described.

The method for manufacturing an electronic component according to the embodiment of the present disclosure is the method for manufacturing the electronic component 1 according to the above embodiment.

First, a solution containing a metal ion is prepared.

Examples of the metal ion include a Ni ion, a Cu ion, a Au ion, and a Ag ion. Among them, a Ni ion and a Cu ion are preferable from the viewpoints that the metals have a melting points of a temperature at the time of mounting (for example, 250° C.) or more and are inexpensive.

As the solution containing the metal ion, for example, a nickel sulfate bath, a nickel sulfamate bath, a copper sulfate bath, a copper pyrophosphate bath, a gold cyanide bath, a sodium gold sulfite bath, a silver cyanide bath, or a silver methanesulfonate bath can be used.

The concentration of the metal ion in the solution is not particularly limited, but is preferably 0.1 mol/L or more and 2 mol/L or less, and more preferably 0.5 mol/L or more and 1.5 mol/L or less.

Figure 14:
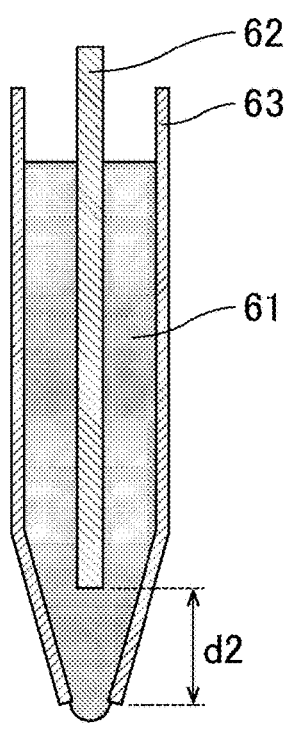
FIG. 14 is a sectional view schematically illustrating an example of an aspect in which a solution is filled into a probe in the method for manufacturing an electronic component according to an embodiment of the present disclosure.
Figure 15:
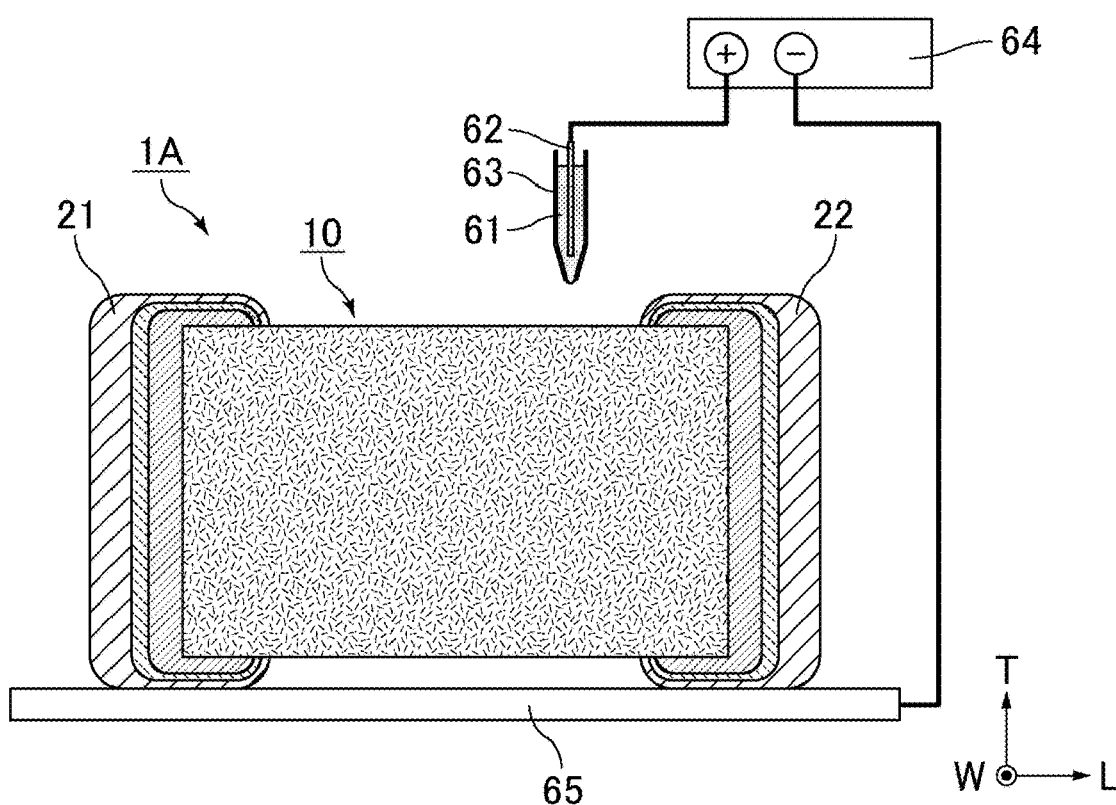
FIG. 15 is a sectional view schematically illustrating an example of a device used in the method for manufacturing an electronic component according to an embodiment of the present disclosure.

FIG. 14 is a sectional view schematically illustrating an example of an aspect in which a solution is filled into a probe in the method for manufacturing an electronic component according to an embodiment of the present disclosure. FIG. 15 is a sectional view schematically illustrating an example of a device used in the method for manufacturing an electronic component according to an embodiment of the present disclosure. Note that, in FIG. 15 and FIG. 16 to be described later, illustration of the internal conductor of the element body 10 is omitted.

Next, as illustrated in FIG. 14, the above-described solution 61 is filled into a cylinder probe 63 in which an electrode 62 is disposed. The probe 63 has a cylindrical shape tapered toward the tip, and the rod-shaped electrode 62 is fixed in a state where the rod-shaped electrode is inserted into an internal space of the probe.

An opening having a circular shape in plan view is provided at the tip of the probe 63. The tip diameter (radius of the opening) of the probe 63 is preferably 10 nm or more and 1000 nm or less, and more preferably 100 nm or more and 500 nm or less.

As illustrated in FIG. 14, one end of the electrode 62 is inserted to the vicinity of the tip of the probe 63, and as illustrated in FIG. 15, the other end is electrically connected to an electrical supply means 64. The material of the electrode 62 is not particularly limited, but for example, a general reference electrode such as a hydrogen electrode or a silver-silver chloride electrode can be used. The distance d2 between one end of the electrode 62 and the tip of the probe 63 is preferably 1 μm or more and 100 μm or less, and more preferably 10 μm or more and 50 μm or less.

An electronic component 1A illustrated in FIG. 15 corresponds to the electronic component 1 before the code 30 is formed (the same as the electronic component 1 except that the code 30 has not been formed), and is disposed such that the external electrodes 21 and 22 are in contact with an electrical supply plate 65. That is, the electronic component 1A is a divided electronic component after firing. The electrical supply plate 65 is electrically connected to the electrical supply means 64.

A position control device (not illustrated) that controls the position of the probe 63 in a three-dimensional space is connected to the probe 63. The position control device includes, for example, a Z-axis stage that holds the probe 63 such that the probe is movable in the Z direction (vertical direction, for example, the height direction T), an XY axis stage that holds the placed electrical supply plate 65 such that the plate is movable in the XY direction (horizontal direction, for example, a direction parallel to the length direction L and the width direction W), and a controller that controls the Z-axis stage and the XY axis stage.

Figure 16:
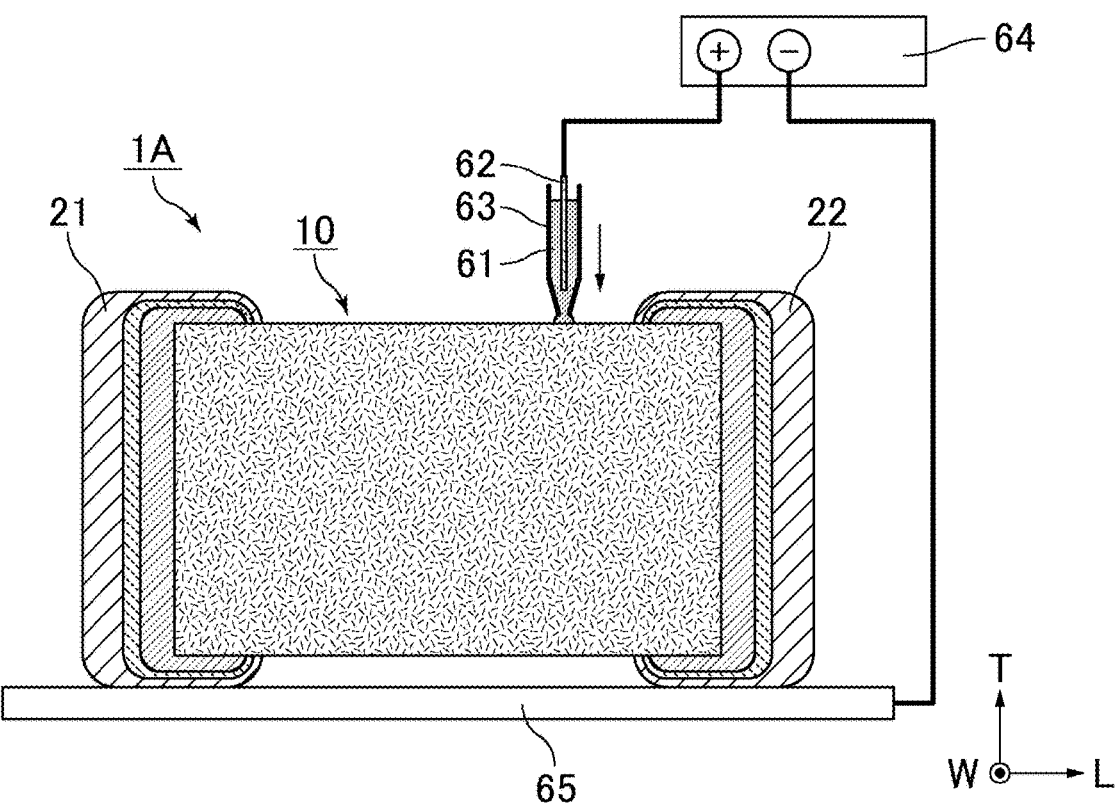
FIG. 16 is a sectional view schematically illustrating an example of an aspect in which a tip of a probe is brought close to an element body of an electronic component in the method for manufacturing an electronic component according to an embodiment of the present disclosure.
Figure 17:
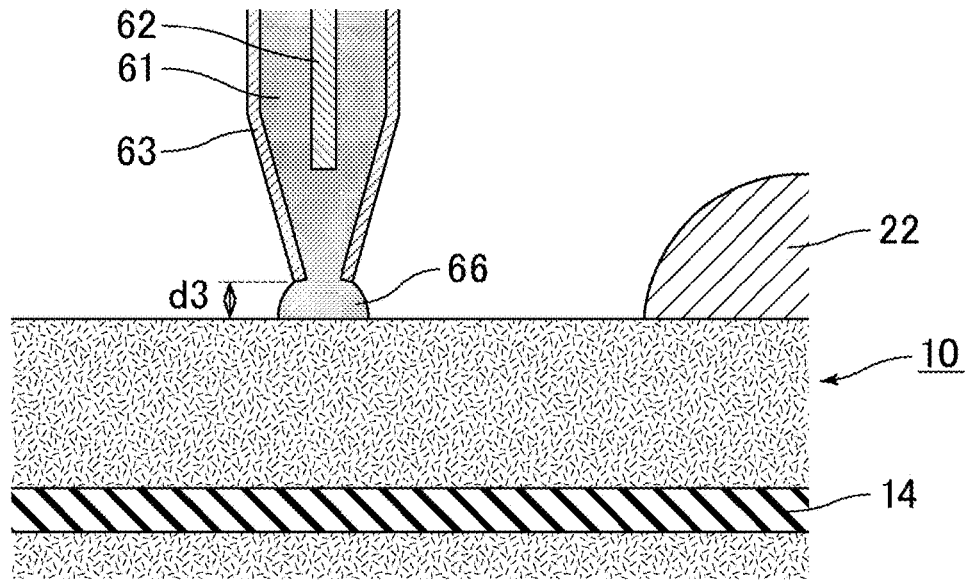
FIG. 17 is a sectional view schematically illustrating an example of an aspect in which a meniscus is formed between an element body and a probe in the method for manufacturing an electronic component according to an embodiment of the present disclosure.

FIG. 16 is a sectional view schematically illustrating an example of an aspect in which a tip of a probe is brought close to an element body of an electronic component in the method for manufacturing an electronic component according to an embodiment of the present disclosure. FIG. 17 is a sectional view schematically illustrating an example of an aspect in which a meniscus is formed between an element body and a probe in the method for manufacturing an electronic component according to an embodiment of the present disclosure.

Next, as illustrated in FIG. 16, an X point, a Y point, and a Z point of the probe 63 are controlled to bring the tip of the probe 63 close to the element body 10 of the electronic component 1A (probe position control step). That is, the probe 63 is moved by the position control device, and the tip thereof is disposed above the region of the element body 10 where the metal particle is to be formed.

Thereafter, as illustrated in FIG. 17, the solution 61 discharged from the tip of the probe 63 is brought into contact with the element body 10. That is, the probe 63 is moved downward by the position control device until the solution 61 comes into contact with the element body 10. Then, a meniscus 66 is formed between the element body 10 and the probe 63 (meniscus forming step). In this way, the solution 61 does not unlimitedly spread out on the element body 10, but remains on the element body 10 due to its surface tension and becomes hemispherical. The amount of the solution 61 in contact with the element body 10 is very small.

At this time, the shortest distance d3 between the tip of the probe 63 and the element body 10 is preferably 15 nm or more and 1500 mm or less, more preferably 150 nm or more and 750 nm or less, and still more preferably 300 nm or more and 750 nm or less.

The radius of the meniscus 66 is not particularly limited, but is preferably 20 nm or more and 2000 nm or less, more preferably 50 nm or more and 1000 nm or less, and still more preferably 100 nm or more and 500 nm or less.

Figure 18:
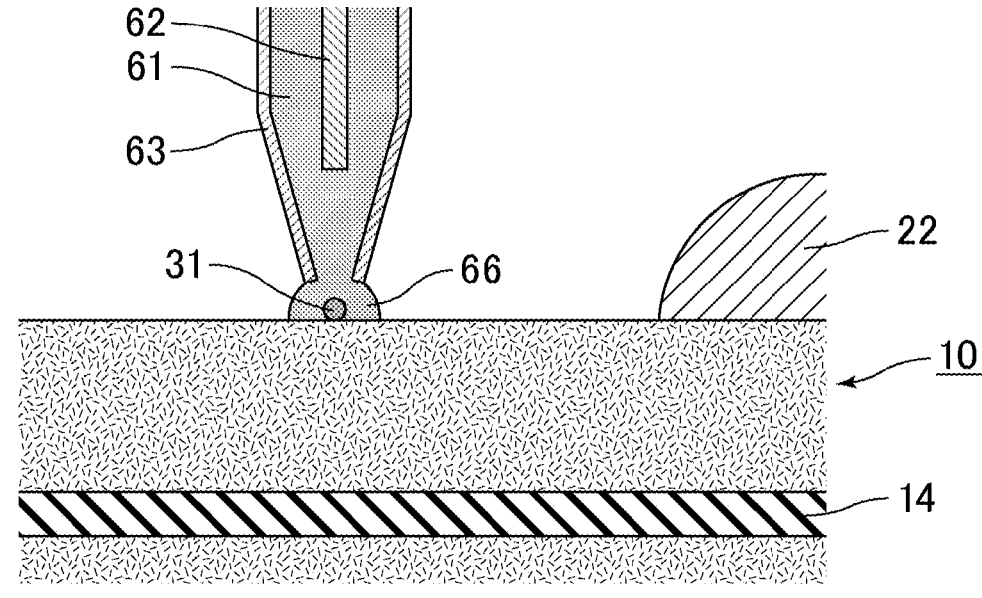
FIG. 18 is a sectional view schematically illustrating an example of an aspect in which a metal particle is deposited on an element body in the method for manufacturing an electronic component according to an embodiment of the present disclosure.

FIG. 18 is a sectional view schematically illustrating an example of an aspect in which a metal particle is deposited on an element body in the method for manufacturing an electronic component according to an embodiment of the present disclosure.

Next, as illustrated in FIG. 18, a voltage is applied between the external electrodes 21 and 22 of the electronic component 1A and the electrode 62 in a state where the meniscus 66 is formed, and a metal particle 31 is deposited on the element body 10 (metal particle deposition step). That is, assuming power is supplied to the external electrodes 21 and 22 and the electrode 62 by the electrical supply means 64, a leakage current is generated, and the metal ion is reduced on the element body 10 to deposit the metal particle 31. Thereafter, the tip of the probe 63 is moved away from the meniscus 66.

A pulse voltage is applied to the external electrodes 21 and 22 and the electrode 62 in the cathode direction, and the particle radius of the metal particle 31 can be controlled by controlling the voltage. Specifically, the larger the voltage value of the pulse voltage is, or the longer the application time of the pulse voltage is, the larger the particle radius of the metal particle 31 to be deposited can be. In this way, the metal particles 31 for forming the code 30 and the metal particles 41 for forming the frame portion 40 can be differently formed.

The voltage of the pulse voltage is preferably 1 V or more and 100 V or less, and more preferably 10 V or more and 50 V or less.

The application time of the pulse voltage is preferably 100 μs or more and 10 s or less, and more preferably 500 μs or more and 1 s or less.

Note that a predetermined voltage may be always applied to the external electrodes 21 and 22 and the electrode 62 from the stage before the solution 61 discharged from the tip of the probe 63 is brought into contact with the element body 10. In this way, a leakage current generated at the moment assuming the solution 61 comes into contact with the element body 10 may be detected, and a pulse voltage may be applied in accordance with the detected timing to deposit the metal particle 31.

In addition, this leakage current may be generated from conducting portions such as the external electrodes 21 and 22 and the internal electrode layers 13 and 14, but the metal particle 31 can be more effectively deposited by using the leakage current from the external electrode 22 (or 21). Thus, the code 30 is preferably disposed in the vicinity of the external electrode 22 (or 21) as described above.

Figure 19:
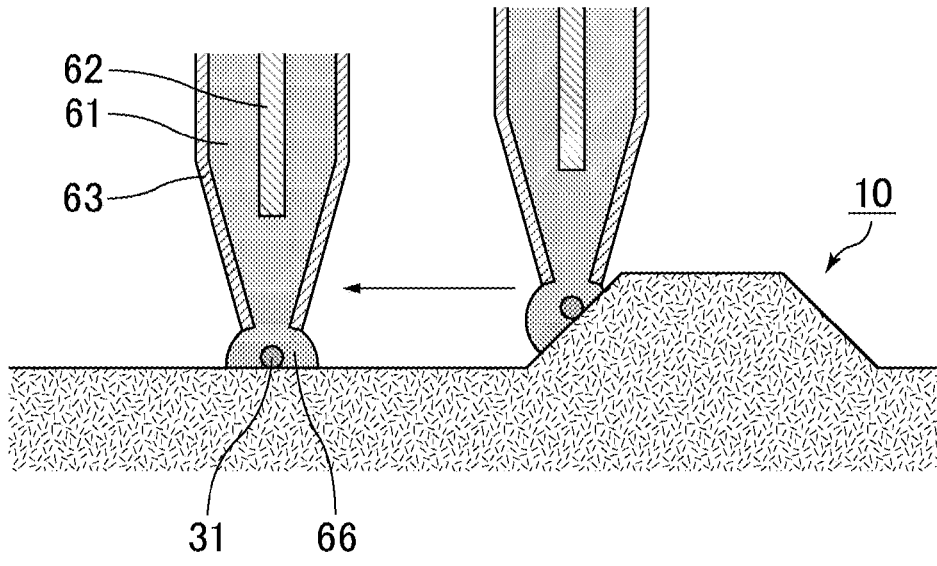
FIG. 19 is a sectional view schematically illustrating an example of an aspect in which a probe is scanned on an element body in the method for manufacturing an electronic component according to an embodiment of the present disclosure.

FIG. 19 is a sectional view schematically illustrating an example of an aspect in which a probe is scanned on an element body in the method for manufacturing an electronic component according to an embodiment of the present disclosure.

Thereafter, as illustrated in FIG. 19, by repeatedly performing the position control step of the probe 63, the meniscus formation step, and the metal particle deposition step described above, the metal particles 31 can be deposited while the particle radius and arrangement are controlled. That is, the code 30 can be formed of the metal particles 31. According to this method, also in a case where the element body 10 has a step, the probe 63 can be scanned along the step to form the code 30.

Figure 20:
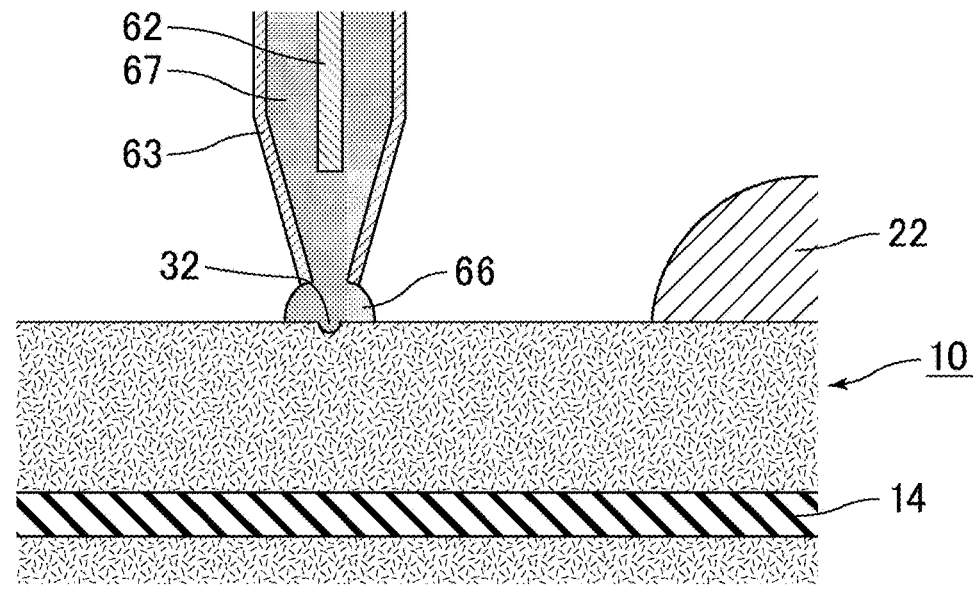
FIG. 20 is a sectional view schematically illustrating an example of an aspect in which a recess is formed on an element body in the method for manufacturing an electronic component according to an embodiment of the present disclosure.

FIG. 20 is a sectional view schematically illustrating an example of an aspect in which a recess is formed on an element body in the method for manufacturing an electronic component according to an embodiment of the present disclosure.

In the above example, the metal particle 31 is deposited using the solution 61 containing the metal ion, but as illustrated in FIG. 20, a solution 67 containing a strong acid may be used instead of the solution 61. Then, a voltage may be applied between the external electrodes 21 and 22 of the electronic component 1A and the electrode 62 in a state where the meniscus 66 is formed, and a part of the element body 10 may be dissolved to form a recess 32 on the element body 10 (recess forming step).

The strong acid is an electrolyte that almost fully ionizes protons assuming equilibrium is reached in the solution 67, and specifically, for example, hydrochloric acid, nitric acid, sulfuric acid, a mixed solution thereof, or the like can be used. The solution 67 is usually a strong acid aqueous solution containing a strong acid and water.

The concentration of the strong acid in the solution 67 is not particularly limited, but is preferably 1 mol/L or more and 10 mol/L or less, and more preferably 2 mol/L or more and 5 mol/L or less.

The conditions are the same as those in the case of using the solution 61 containing the metal ion.

Also in a case where the solution 67 is used, the larger the voltage value of the pulse voltage (however, in the anode direction) is, or the longer the application time of the pulse voltage is, the larger the radius of the recess 32 can be. In this way, the recesses 32 for forming the code 30 and the recesses 42 for forming the frame portion 40 can be differently formed.

However, assuming the solution 67 is used, it is not necessary to apply a voltage between the external electrodes 21 and 22 and the electrode 62. That is, since a part of the element body 10 is dissolved by bringing the solution 67 into contact, the recess 32 can be formed on the element body 10 by taking advantage of this. In this case, the longer the contact time is, the larger the radius of the recess 32 can be. However, from the viewpoint of controlling the shape of the recess 32, it is preferable to apply a voltage between the external electrodes 21 and 22 and the electrode 62 also in a case where the solution 67 is used.

According to the above-described method, since the code 30 can be formed after the barrel step for taking the corners of the electronic component 1, the coating and plating steps for forming the external electrodes 21 and 22, and the like, it is possible to prevent a decrease in yield in these steps.

Figure 21:
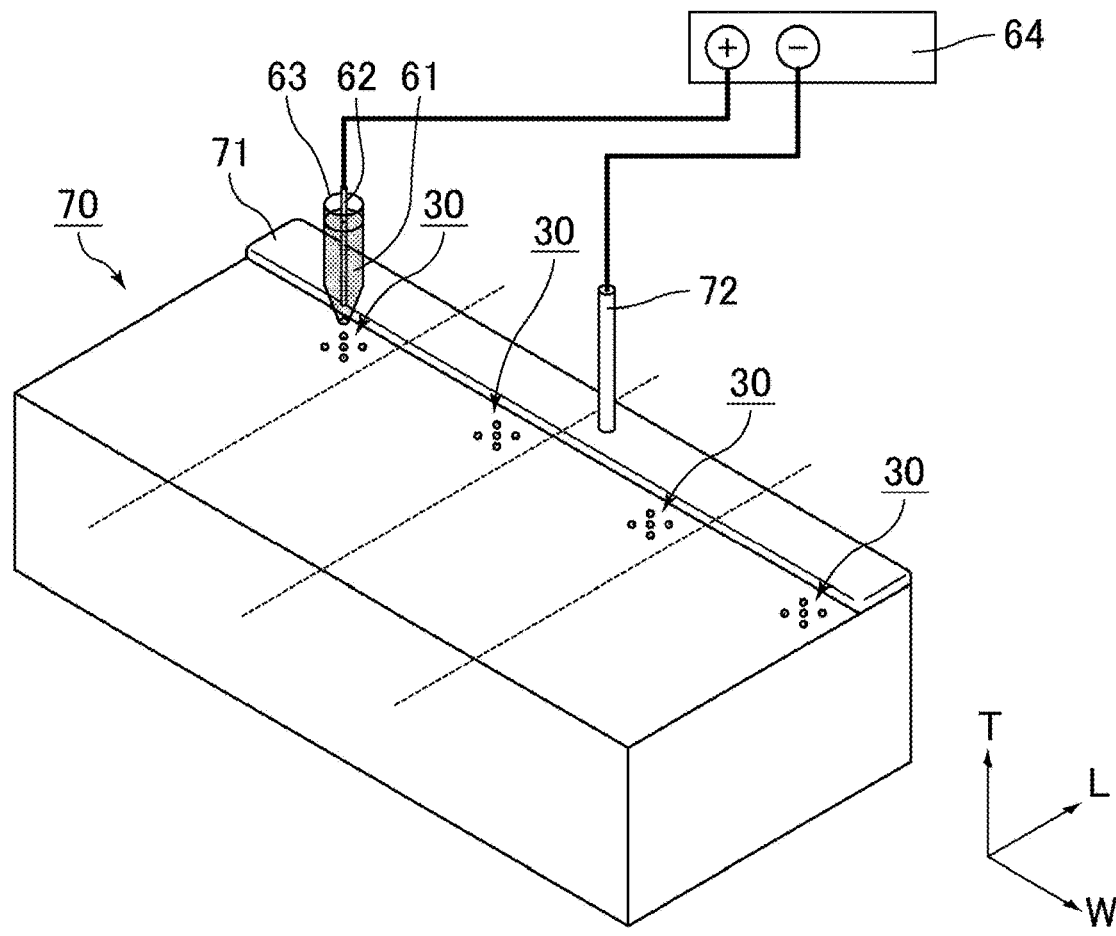
FIG. 21 is a perspective view schematically illustrating another example of the method for manufacturing an electronic component according to an embodiment of the present disclosure.

FIG. 21 is a perspective view schematically illustrating another example of the method for manufacturing an electronic component according to an embodiment of the present disclosure.

In the above example, the aspect in which the code 30 is formed for the individual electronic component 1 has been described. However, as illustrated in FIG. 21, before an electronic component block 70 in the semi-finished product state is divided into electronic components, the code 30 may be formed in each electronic component region, and then the electronic component block 70 may be cut and divided into electronic components. In this case, a dummy electrode 71 for energization may be formed, for example, on the top surface, a terminal 72 electrically connected to the electrical supply means 64 may be brought into contact with the dummy electrode 71 to form the code 30, then dividing may be performed, and thereafter, a normal external electrode may be formed on a portion also including the side surface and the bottom surface, whereby the structure of the electronic component 1 described above can be obtained.
(Traceability System)

Figure 22:
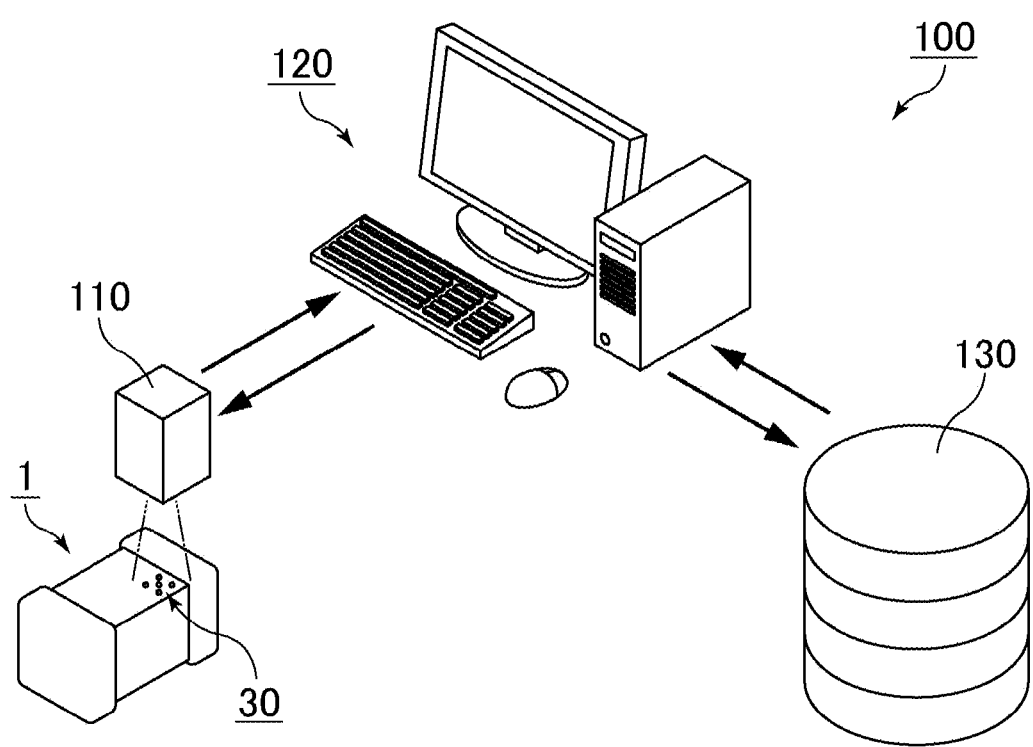
FIG. 22 is a diagram schematically illustrating an example of a traceability system according to an embodiment of the present disclosure.

Next, a traceability system according to an embodiment of the present disclosure will be described. FIG. 22 is a diagram schematically illustrating an example of a traceability system according to an embodiment of the present disclosure.

A traceability system 100 illustrated in FIG. 22 includes a code reader 110, an information processing apparatus 120 communicably connected to the code reader 110 via a network, and a database 130 communicably connected to the information processing apparatus 120 via the network.

The code reader 110 reads the code 30 of the electronic component 1 described above. The code reader 110 includes, for example, an image acquisition unit (not illustrated) that acquires an image (gray image) of the code 30, and an image processing unit (not illustrated) that binarizes the acquired image of the code 30 to generate a binarized image, performs decoding processing of the code 30 on the basis of the generated binarized image, and restores information indicated by the code 30.

The code reader 110 reads the component ID, the product type information, and the material information indicated by the code 30.

Note that, as the image acquisition unit of the code reader 110, for example, an optical microscope with a camera such as a digital microscope can be used. In addition, the image acquisition unit of the code reader 110 may include a scanning electron microscope (SEM).

Furthermore, the image processing unit of the code reader 110 is configured as a computer system including a central processing unit (CPU), a memory, and the like, and realizes the above-described processing by executing a predetermined software program in the CPU.

The database 130 stores (retains) component treatment information specifying a treatment method after use of the electronic component for each product type of the electronic component. Examples of the treatment method after use include recycling, reuse, rebuilding, and disposal of the electronic component.

The information processing apparatus 120 is configured as a computer system including a CPU, a memory, and the like, and further includes input devices such as a keyboard and a mouse, and a display device such as a liquid crystal display.

The information processing apparatus 120 collates the product type of the electronic component 1 read by the code reader 110 with the component treatment information in the database 130 to determine (search) a treatment method after use of the electronic component 1. Then, the information processing apparatus 120 outputs the determined result to the display device, and the user can confirm the treatment method after use of the electronic component 1 on the display device.

The database 130 may store (retain) component treatment information specifying a treatment method after use of the electronic component for each product type and material of the electronic component, and the information processing apparatus 120 may collate the product type and material of the electronic component 1 read by the code reader 110 with the component treatment information of the database 130 to determine the treatment method after use of the electronic component 1.

In the above embodiment, the cases where a two-dimensional code is provided as the code have been described, but in the present disclosure, the code may be a one-dimensional code such as a barcode. In this case, each line of the one-dimensional code can be drawn using a plurality of metal particles or recesses.

In the above embodiment, the cases where the code is formed of the metal particles or the recesses have been described, but in the present disclosure, one code may be formed using both the metal particles and the recesses.

The following content is disclosed in the present specification.
<1>

An electronic component including an element body and an external electrode provided on the element body,
in which metal particles having a particle radius of 10 nm or more and 1000 nm or less are disposed on the element body so as to form a code.
<2>

The electronic component according to <1>, in which metal particles having a particle radius different from the particle radius of the metal particles are disposed on the element body so as to form a frame portion surrounding the code.
<3>

The electronic component according to <1> or <2>, further including a glass coating film that covers the metal particles forming the code on the element body.
<4>

The electronic component according to any one of <1> to <3>, in which the code is disposed within a range of 100 μm or less from the external electrode.
<5>

An electronic component including an element body and an external electrode provided on the element body,
in which recesses having a radius of 10 nm or more and 1000 nm or less in plan view are disposed on the element body so as to form a code.
<6>

The electronic component according to <5>, in which recesses having a radius different from the radius of the recesses in plan view are disposed on the element body so as to form a frame portion surrounding the code.

17
18

<7>
The electronic component according to <5> or <6>, in which the code is disposed within a range of 100 μm or less from the external electrode.

<8>
The electronic component according to any one of <1> to <7>, in which the code is a two-dimensional code.

<9>
The electronic component according to any one of <1> to <8>, in which information indicated by the code includes information indicating a product type of the electronic component.

<10>
The electronic component according to <9>, in which the information indicated by the code further includes information indicating a material of the electronic component.

<11>
A method for manufacturing the electronic component according to any one of <1> to <10>, the method including the steps of:
    preparing a solution containing a metal ion;
    filling the solution into a probe having a cylinder shape in which an electrode is disposed;
    controlling an X point, a Y point, and a Z point of the probe to bring a tip of the probe close to an element body of the electronic component;
    bringing the solution discharged from the tip of the probe into contact with the element body to form a meniscus between the element body and the probe; and
    applying a voltage between an external electrode of the electronic component and the electrode in a state where the meniscus is formed to deposit a metal particle on the element body.

<12>
A method for manufacturing the electronic component according to any one of <1> to <10>, the method including the steps of:
    preparing a solution containing a strong acid;
    filling the solution into a probe having a cylinder shape;
    controlling an X point, a Y point, and a Z point of the probe to bring a tip of the probe close to an element body of the electronic component;
    bringing the solution discharged from the tip of the probe into contact with the element body to form a meniscus between the element body and the probe; and
    dissolving a part of the element body in a state where the meniscus is formed to form a recess on the element body.

<13>
The method for manufacturing an electronic component according to <12>, in which an electrode is disposed inside the probe, and
    in the step of forming the recess, a voltage is applied between an external electrode of the electronic component and the electrode in a state where the meniscus is formed.

<14>
A traceability system including:
    a code reader that reads the code of the electronic component according to <9> or <10>;
    a database storing component treatment information specifying a treatment method after use of the electronic component for each product type of the electronic component; and
    an information processing apparatus that collates the product type of the electronic component read by the code reader with the component treatment information in the database to determine a treatment method after use of the electronic component.

DESCRIPTION OF REFERENCE SYMBOLS 1, 1A: Electronic component
10: Element body
10a: Top surface
10b: Bottom surface
10c: First side surface
10d: Second side surface
10e: Third side surface
10f: Fourth side surface
11: Dielectric layer
12: Dielectric ceramic layer
13, 14: Internal electrode layer
21, 22: External electrode
23: Resin electrode layer
24: Ni plating layer
25: Outermost layer
26: Sn plating layer
30: Code
31, 41: Metal particle
32, 42: Recess
40: Frame portion
50: Glass coating film
61, 67: Solution
62: Electrode
63: Probe
64: Electrical supply means
65: Electrical supply plate
66: Meniscus
70: Electronic component block
71: Dummy electrode
72: Terminal
100: Traceability system
110: Code reader
120: Information processing apparatus
130: Database

The invention claimed is:
1. A traceability system comprising:
a code reader that reads a code of an electronic component;
a database storing component treatment information specifying a treatment method after use of the electronic component for each product type of the electronic component; and
an information processing apparatus that collates the product type of the electronic component read by the code reader with the component treatment information in the database to determine a treatment method after use of the electronic component, wherein
the electronic component includes an element body and an external electrode provided on the element body,
metal particles having a particle radius of 10 nm or more and 1000 nm or less are disposed on the element body so as to form the code, or recess having a radius of 10 nm or more and 1000 nm or less in plan view are disposed on the element body so as to form the code, and
wherein information indicated by the code includes information indicating a product type of the electronic component.

* * * * *